Feb. 2, 1965    R. P. OGDEN    3,168,278
HYDRO-MECHANICAL VEHICLE SEAT SUSPENSION
Filed May 2, 1962    2 Sheets-Sheet 1

INVENTOR.
RALPH P. OGDEN
BY
Mann, Brown & McWilliams
ATTORNEYS

Feb. 2, 1965          R. P. OGDEN          3,168,278
HYDRO-MECHANICAL VEHICLE SEAT SUSPENSION
Filed May 2, 1962          2 Sheets-Sheet 2
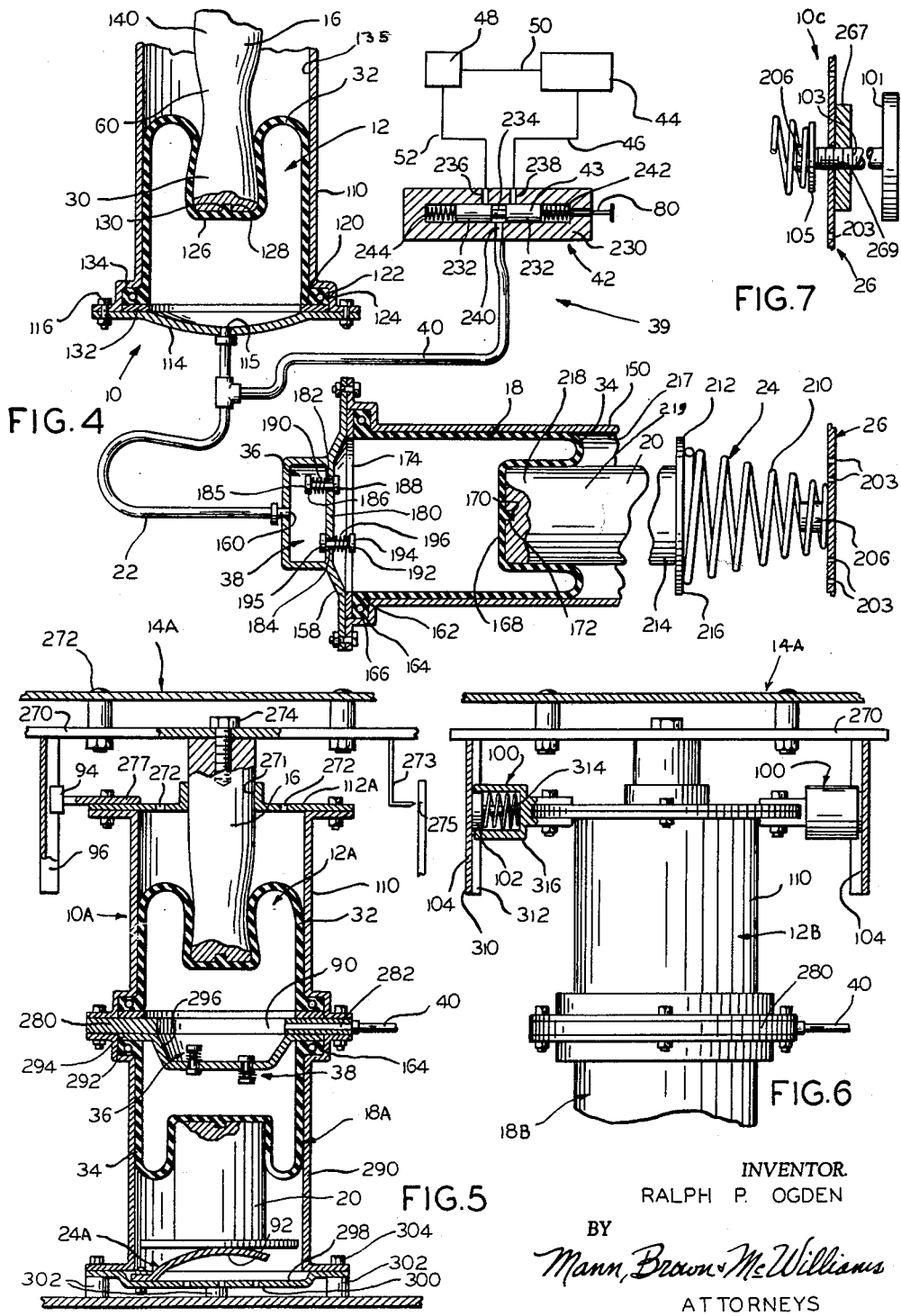
INVENTOR.
RALPH P. OGDEN
BY
Mann, Brown & McWilliams
ATTORNEYS

United States Patent Office 3,168,278
Patented Feb. 2, 1965

3,168,278
HYDRO-MECHANICAL VEHICLE SEAT
SUSPENSION
Ralph P. Ogden, 7522 Walnut St., Hammond, Ind.
Filed May 2, 1962, Ser. No. 191,998
5 Claims. (Cl. 248—377)

My invention relates to a hydro-mechanical vehicle seat suspension, and more particularly, to a vehicle seat suspension arrangement that is particularly suited for application to low frequency vibration insulating situations.

Vehicle seat suspensions, like all suspension arrangements, are intended to provide some insulation or protection against vibration caused by rough rides. However, the fact that the vehicle seat suspension is supposed to take care of the needs of a single person greatly complicates design problems due to the great dissimilarity in individual physical characteristics, and in particular, weights of individuals.

It is relatively easy to device a seat suspension for a particular individual of a given weight. For instance, vibration frequency rates are well-known for particular vehicle driving situations (as, for example, truck seats have vibration rates on the order of 80 cycles per minute, farm tractor seats have vibration rates on the order of 50 cycles per minute, and earth scraper seats have vibration rates on the order of 20 cycles per minute), and to find a suspension spring rate best suited for that particular individual, it is merely necessary to determine the known vibration frequency rate involved for the type of vehicle in question, take the individual's weight, and using a standard natural frequency formula, determine the spring rate that will be the natural frequency of vibration for that particular spring system.

This is because the most comfortable ride for any given individual will be had when the spring system of which the individual forms a part (when he is on the seat) responds to vertical shocks at the natural frequency of vibration of that system.

However, the resulting spring rate will not be satisfactory for lighter or heavier persons, as their individual weights will change the natural frequency of the spring system they become a part of (as when they assume the vehicle seat in question). Thus, the spring system in question will be too stiff for a lighter person, and he will therefore have a "harder" ride, while the system will be too soft for a heavier person as he will "bottom out" on hard bumps, and he will thus have too "soft" a ride.

These problems have been solved to some extent by using a variable spring rate type spring arrangement in connection with the seat suspension, as is suggested for instance by White et al. Patent 2,470,907. However, so far as I am aware, no known rising spring rate spring arrangement gives satisfactory results in the low frequency ranges, and the reason for this may be explained to some extent by the fact that mechanical pneumatic or hydro-pneumatic spring devices have universally been proposed for use in such suspensions; and mechanical springs are usually too stiff for low frequency applications while other arrangements employing gas cushions are unreliable at low frequencies because of anomalies caused by gas temperature changes during vibration.

In other words, vehicle seat suspensions heretofore proposed lack the sensitivity of adjustment and control to provide a ride at low frequency that is exactly suited for each individual who might use the seat.

A principal object of this invention is to provide a vehicle seat suspension that is especially adapted to give an optimum ride for all comers at the low frequencies that are generally associated with, for instance, farm tractors and earth scrapers.

Another important object of my invention is to provide a hydro-mechanical vehicle seat suspension that combines the desirable features of hydraulics and mechanical springs into one suspension that has the sensitivity of adjustment and control required to solve the long-standing low frequency seat suspension problems above referred to.

Still further objects of the invention are to provide a vehicle seat suspension arrangement that is susceptible of a wide variety of variations, thus increasing its adaptability to given situations, to provide a vehicle seat suspension that avoids complex design and operation problems, and to provide a vehicle seat suspension that is economical of manufacture, convenient in use, and readily adapted to a wide variety of vehicle seat suspension situations.

Other objects, uses and advantages will be obvious or become apparent from a consideration of the following detailed description and the application drawings.

In the drawings:

FIGURE 4 is a diagrammatic illustration better illustrating the components of the suspension shown in FIGURES 1 and 2;

FIGURE 5 is a diagrammatic vertical cross-sectional view through a modified form of seat suspension in accordance with this invention;

FIGURE 6 illustrates a variation of the form of the invention shown in FIGURE 5; and FIGURE 7 is a fragmental sectional view illustrating a modification of the form of the invention shown in FIGURES 1–4.

Figures 1, 2, 3:
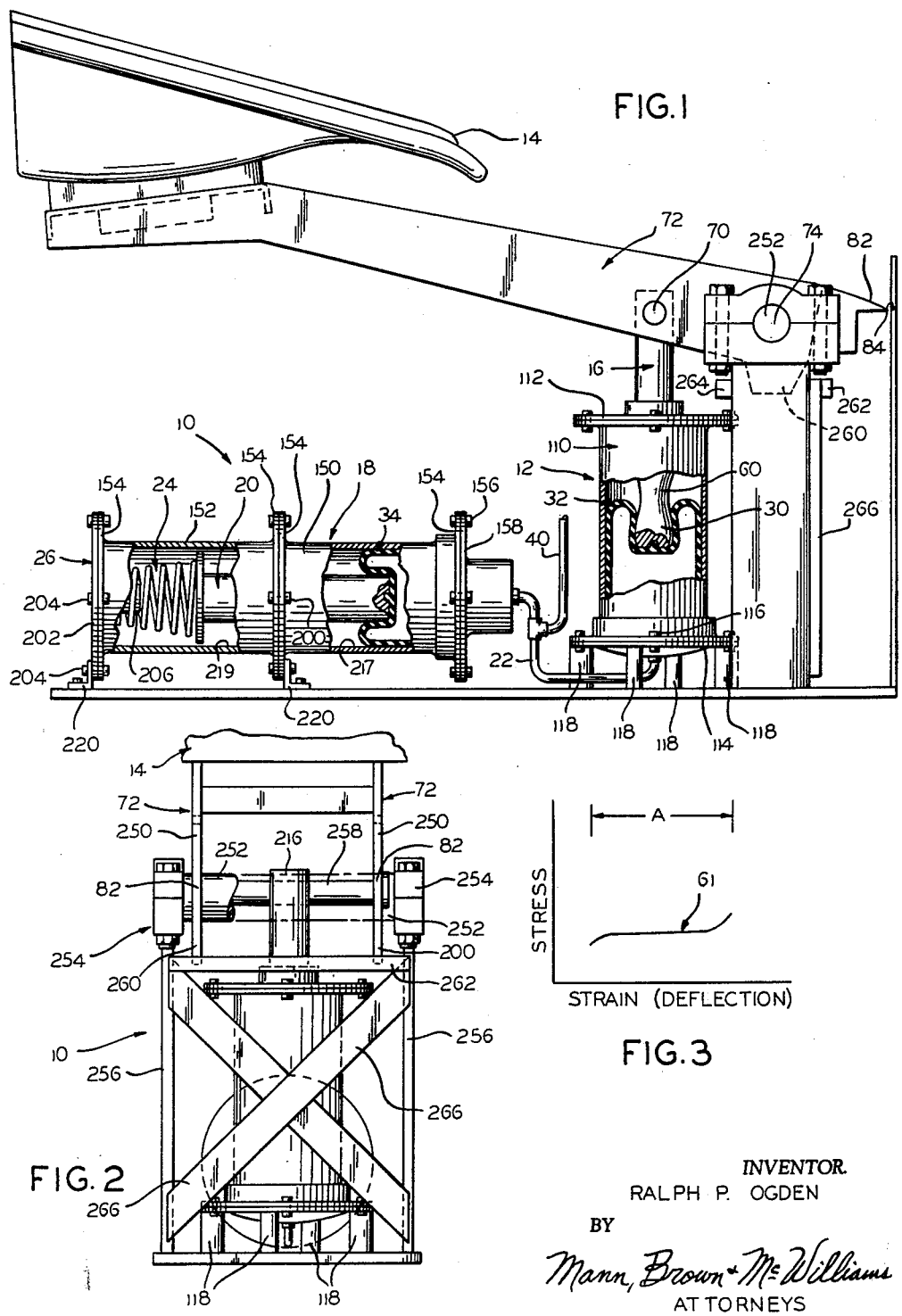
FIGURE 1 is a side elevational view of a tractor seat suspension in accordance with my invention.
FIGURE 2 is a front elevational view of the apparatus shown in FIGURE 1, taken from the right hand side of FIGURE 1.
FIGURE 3 is a graph illustrating a preferred spring rate curve for the suspension arrangement of FIGURES 1 and 2.

However, it should be understood that the specific drawing illustrations are provided primarily to comply with the requirements of 35 U.S.C. 112, and that the invention may be embodied in other specific arrangements, as will be obvious to those skilled in the art. Consequently, the scope of this invention is not to be considered limited other than as indicated by the appended claims.

*General description*

Reference numeral 10 of FIGURES 1 and 2 generally indicates a specific form of seat suspension arrangement in which my invention has been embodied.

The suspension 10 generally comprises a load chamber 12 supporting an appropriate form of tractor seat 14 through a spindle-like piston 16, a spring chamber 18 provided with a reciprocably mounted piston 20, a conduit 22 of any suitable type that connects the chambers 12 and 18 to provide for fluid flow therebetween, and a mechanical spring device 24 acting between piston 20 and a relatively fixed abutment or wall 26.

As best brought out in FIGURE 4, the lower end 30 of piston 16 engages and is carried by a rolling diaphragm member 32, while the piston 20 engages a rolling diaphragm member 34. The spring chamber in the embodiment of FIGURES 1–4 is provided with damping valves 36 and 38 (see FIGURE 4).

The space between the two rolling diaphragms 32 and 34, including that defined by conduit 22, is fully charged with hydraulic liquid (not shown), the volume of which may be controlled in any suitable manner, as by employing a hydraulic liquid control arrangement 39 including a supply conduit 40 controlled by an appropriate form of two-way control valve 42, which is arranged to return excess hydraulic liquid to tank 44 through suitable conduit 46 and supply needed hydraulic liquid to conduit 40 by means of a suitable pump 48 drawing the hydraulic liquid from tank 44 through line 50 and supplying it to line 52 that is in turn connected to valve 42. When valve 42 is positioned so that lines 40 and 46 are in communication, hydraulic liquid will discharge from conduit 40 under the action of spring device 24 and the weight of the person on seat 14, while when valve 42 is positioned so that lines 40 and 52 are in communication, pump 48 will supply hydraulic liquid to the suspension from tank 44.

In accordance with this invention, the spring rate of suspension 10 is designed to have the characteristics depicted by the curve 61 of FIGURE 3, wherein it will be seen that the suspension is to have a rising spring rate at either end of its range of travel (vertical movement, indicated by dimension A of FIGURE 3), but that most of the travel distance is to have a substantially constant spring rate.

Parenthetically, it may be mentioned that the term "spring rate" is intended to mean the force necessary to achieve a given unit of movement or deflection of the suspension.

And, in accordance with this invention, the spring rate obtained is achieved by suitably forming the exterior surface 60 of piston 16 so that, as diaphragm 32 rolls along the piston surface 60, over the range of movement of piston 16 with respect to chamber 12 (indicated by FIGURE 3), the deflection, or vertical movement of seat 14 will follow the curve of FIGURE 3.

Spring device 24 should be designed to have a spring rate of the rising type. While spring device 24 in the form illustrated is of the coil type, it could be any type of mechanical spring of the torsion, leaf, rubber or any other equivalent type or material.

In arranging suspension 10 for a specific application, as, for instance, for application to a farm tractor, the spring rate employed at the substantially constant portion of the curve 61 of FIGURE 3 is obtained by taking the known cycles per minute vibration rate occasioned in operating farm tractors, which is about 50 cycles per minute, and selecting an operator weight factor which represents a reasonable average of weights of persons who will normally operate this vehicle, the lower and upper limits of which might be 100 and 250 pounds. These figures are then applied to a standard natural frequency formula, such as $$f = \frac{1}{2\pi}\sqrt{\frac{K}{M}}$$

wherein $f$ is frequency in cycles per unit of time, pi is 3.14, K is the spring rate, and M is mass, which is equivalent to weight divided by "$g$'s" or gravity.

This computation will give the spring rate desired for the major portion of the range of movement of piston 16, and the external surface 60 of piston 16 is formed in any suitable manner to achieve this spring rate, including the rising rates at the end of the suspension range of travel.

While the spring rate of the spring device 24 will necessarily influence the travel rate of the suspension, the configuration of piston surface 60 in the last analysis is intended to serve as the spring rate control of this invention, and consequently, its configuration will necessarily reflect the spring rate factors that are introduced into the system by the spring device 24.

In use, the components of suspension 10 are applied to the tractor in any suitable manner, such as in the specific arrangement shown in FIGURES 1 and 2, wherein the piston 16 is pivotally secured by a shaft 70 to swing arms 72 that actually carry seat 14, with swing arms 72 being journalled on the tractor in any suitable manner for swinging movement about horizontal axis 74 (see FIGURE 1). This basic seat arrangement, as distinguished from the suspension 10, is illustrated in my application Serial No. 782,875, filed December 24, 1958, now Patent No. 3,033,552, granted May 8, 1962, the disclosure of which is hereby incorporated herein by this reference.

When suspension 10 has been fully assembled on the tractor, it is supplied with an appropriate charge of hydraulic liquid, it being understood that the tank 44 will be carried by the tractor and pump 48 operated by the tractor motor. It will be understood, of course, that pump 48 may be of any suitable type that will serve the purpose intended, though ordinarily, pumps 48 of this type usually employ a by-pass arrangement (not shown) for returning to the tank hydraulic liquid that is not immediately needed for the hydraulic system.

When the tractor is to be operated, the operator mounts the tractor in the usual manner and takes his position on seat 14. He then grasps handle 80 of valve 42 and positions its valve member 43 as may be necessary to position seat 14 at the elevation dictated by pointer 82 (see FIGURE 1), which is fixed to swing arm 72, in relation to a fixed datum 84 mounted in any suitable manner on the tractor (and positioned approximately at the mid position of the range of movement of the seat). This seat positioning operation may involve moving valve member 43 to supply hydraulic liquid to the suspension if the individual is on the heavy side, or moving the valve member 43 to a position to remove hydraulic liquid from the system if the individual is on the light side, but in any event, once pointer 82 is opposite datum 84, the seat 14 is disposed in a position to give the individual the most comfortable ride. As indicated, datum 84 is so disposed that it will be located adjacent the mid point in the travel range of the seat. The travel range of the seat, or its maximum deflection, will be dictated, ordinarily, by the amount of room available.

The operator then may proceed to operate the tractor in the normal way, and the suspension 10 will support the operator and protect him against vertical shocks with a ride substantially equivalent to the natural frequency of the spring system of which the rider forms a part. It will be noted that chambers 12 and 18 in effect define flexing hydraulic cells connected in series and interposed in series between piston 16 and spring device 24.

In the embodiment 10A of FIGURE 5, the seat 14A is applied directly to the piston 16 of the load chamber 12A. Also, the chambers 12A and 18A are fixed directly to each other and are connected together for fluid flow therebetween by port 90. The spring device 24A that cooperates with the piston 20 of spring chamber 18A takes the form of a leaf spring element 92.

The seat 14A is prevented from rotating with respect to the suspension 10A by a guide roller 94 cooperating with channel member 96 carried by the seat.

In the form 10B of FIGURE 6, the load and spring chambers 12B and 18B are substantially the same as shown in FIGURE 5 except that the damping valves 36 and 38 are eliminated in favor of the friction damping devices 100, which comprise spring pressed shoes 102 cooperating with friction surfaces 104 that are fixed with respect to the seat 14A.

In the form 10C of FIGURE 7, which illustrates a variation of the embodiment of FIGURES 1–4, the hydraulic liquid control arrangement 39 is eliminated, and the seat elevation positioning is achieved by the operator turning knurled handle 101 of screw member 103 mounted in wall 26 of spring chamber 18, which screw member fixedly carries flange 105 that serves as a spring seat for spring 210. The turning of screw member 103 causes or permits the displacement of pistons 20 and 16 necessary to properly index the seat.

*Specific Description*

The load chamber 12 in the form of FIGURES 1–4 takes the form of a cylinder member 110, which may have an upper closure member 112 bolted to one end thereof and formed to define an opening of adequate size to receive the piston 16 without interfering with its vertical movement. Closure member may be perforated or foraminous in nature to avoid trapping air above diaphragm 32, or may in practice be omitted entirely.

The cylinder member 110 at its other end is closed by a suitable closure member 114 fixed in place as by appropriate bolts 116.

The load chamber 12 is mounted in any suitable manner on the tractor frame, as by being fixed to spaced lugs 118 which are in turn fixed to the tractor frame.

As best shown in FIGURE 4, the rolling diaphragm member 32 is formed with an annular open lower end 120 provided with an outwardly extending shoulder 122 suitably reinforced as by embedded ring 124. The diaphragm 32 is actually bag-like in configuration and is provided with a closed bottom or end portion 126 having its external surface formed to define a projection 128 that is adapted to seat in a correspondingly proportioned recess 130 formed in the end 30 of piston 16.

Interposed between closure member 114 of load chamber 12 and its tubular member 110 is a sealing ring 132, against which the shoulder 122 of diaphragm 32 seats when the closure member 114 is applied to the cylinder 110. Shoulder 122 also fits within the internal shoulder 134 formed in the adjacent end of the cylinder member 110, and it is contemplated that the shoulder of the cylinder 110 and diaphragm 32 will be proportioned so that when closure member 114 is bolted in place, there will be a complete liquid seal at the juncture between closure member 114 and cylinder member 110.

The diaphragm 32 may be formed from any suitable form of hydraulic impervious material, such as the well-known product Hycar, produced by the B. F. Goodrich Chemical Company of Akron, Ohio. Hycar is a copolymer of butadiene and acrylonitrile.

The piston 16 in the embodiment of FIGURES 1-4 is a spindle-like element 140 which has the aforedescribed configuration 60 adjacent its lower end 30 for purposes of controlling the spring rate of the suspension 10. Alternately, however, the internal surface 135 of cylinder 110 may be formed or shaped to provide this controlling action, or both the piston and cylinder surfaces so employed as diaphragm 32 rolls along both surfaces.

The spring chamber 18 in the form of FIGURES 1-4 is defined by a pair of tubular members or cylinders 150 and 152 formed with flanged ends 154.

One of the flanged ends 154 of the cylinder 150 has fixed thereto as by bolts 156 a closure member 158, which is formed adjacent its central axis with an appropriate opening 160 to which the conduit 22 is connected (see FIGURE 4). The rolling diaphragm 34 of the chamber 18 is substantially the same in nature as diaphragm 32, it defining an open end 162 provided with an outwardly extending shoulder 164 reinforced by suitable embedded ring 166. Diaphragm 34 is of generally bag-like configuration and includes a closed end or bottom 168 formed with an outwardly extending projection 170 adapted to be received in a correspondingly shaped recess 172 formed in piston 20.

Interposed between the closure member 158 and shoulder 164 of diaphragm 34 is a sealing ring 174 which serves the same purpose as ring 132 of chamber 12.

The closure member 158 is formed in any suitable manner to define an oil impervious wall structure 180 defining a pair of orifice openings 182 and 184 in which the damping valves 36 and 38 are respectively mounted. The damping valve 36 comprises a valve member 185 defining oppositely disposed head members 186 and 188 with a suitable coil compression spring 190 being applied between wall structure 180 and head 186 to bias the valve member 185 to the position shown in FIGURE 4.

The damping valve 38 generally comprises valve member 192 formed with a pair of oppositely disopsed head members or portions 194 and 195, with a suitable coil compression spring 196 being applied between the wall structure 180 and the head 194 to bias the valve member 192 to the position shown in FIGURE 4.

The damping valves seal off any liquid flow through orifice openings 182 and 184 respectively until the heads 188 and 195 of the respective valves are lifted off their seats by pressure acting on their stem or inner sides (when the necessary pressure differential exists). The damping action provided by these valves may be varied to suit conditions by varying the compressive forces applied by springs 190 and 196. Basically, the valve 36 will operate to admit hydraulic liquid to spring chamber 18 when the operator mounts the seat, or when hydraulic liquid is added to the suspension, and valve 38 will operate to release hydraulic liquid from chamber 18 when the operator leaves his seat or when hydraulic liquid is removed from the suspension.

As indicated in FIGURE 1, the adjacent flanges 154 of cylinders 150 and 152 are bolted together by appropriate bolts 200 and cylinder 152 has fixed to its other end a suitable closure member 202 fixed in place by appropriate bolts 204. Closure member 202 in the form illustrated forms wall or abutment 26 and is provided with a suitable coil spring centering stud 206 and is formed to define a plurality of air breather vents 203 to avoid entrapment of air between it and diaphragm 34.

The spring device 24 in the form of FIGURES 1-4 takes the form of a conical helical spring 210, one end of which seats against the closure member 202 of cylinder 152, and the other end of which seats against the flanged end 212 of piston 20. Piston 20 may be of any suitable type, but in the form shown it is a cylindrical member 214 formed at one end with a flange 216 that defines flanged end 212, and the other end 218 is applied against the center portion or closed end 168 of diaphragm 34. Preferably, the surfaces 217 and 219 of the chamber 18 cylinders and piston (respectively) are rectilinear in longitudinal configuration.

The cylinders 150 and 152 are preferably fixed against movement in any suitable manner, as by being bolted to angle brace members 220 that are in turn fixed to the tractor frame in any appropriate manner.

Conduit 22 may be of any appropriate type that serves to define a conduit between the opening 160 of chamber 18 and the opening 115 of chamber 12. Conduit 40 extends between the valve 42 and conduit 22 to provide communication therebetween for the purpose of supplying and removing hydraulic liquid from the suspension.

Valve 42 may be of any suitable type, but in the form shown it comprises valve member 43 mounted for sliding movement within a casing 230, with handle 80 being connected to the valve member 43 for purposes of moving same to the desired positions.

Valve member 43 in the form shown comprises a pair of head members 232 spaced from a spindle portion 234 of reduced cross section the distance required to place either port 236 or port 238 in communication with port 240, of valve casing 230, depending upon whether hydraulic liquid is to be supplied to or removed from the suspension.

Appropriate compression springs 242 and 244 may be applied at either end of the valve member 43 to bias it to a centered or neutral position which seals off both ports 236 and 238 from communication with port 240.

As already mentioned, the seat 14 in the forms of FIGURES 1-4 is mounted on swing arms 72. In the specific embodiment illustrated, the swing arms 72 take the form of a pair of levers 250 fixed in spaced relation (see FIGURE 2) to a shaft 252 that is journalled in bearing structures 254 mounted in any suitable manner on top of a pair of spaced supports 256.

The spaced levers 250 carry shaft or bar 70 which passes through and pivotally mounts piston 16.

The levers 250 include angle projections or extensions 260 which project between stop bars 262 and 264 that define the maximum and minimum limits of compression of the suspension 10. The supports 256 may be reinforced by appropriate braces 266, or in any other suitable manner.

In the variation of FIGURE 7, screw member 103 in the specific form illustrated is screw threadedly received in nut 267 fixed, as by welding, to wall 26, and extends through opening 269 formed in such wall 26. Screw flange 105 carries a spring centering stud 206 similar to the arrangement shown in FIGURE 4. The variation is otherwise the same as described in connection with the showing of FIGURES 1–4, except that spring chamber 18 of this embodiment should be oriented to position screw handle 101 for convenient use by the seat user, though obviously suitable gear trains and/or linkages could be employed to effectuate this end, as will be obvious to those skilled in the art.

In the form shown in FIGURE 5, the seat 14A is in effect applied directly to the spindle-like piston 16, and this, of course, eliminates the swing arms 72 and the attendant mounting structure shown in FIGURE 1.

This is done by applying the seat 14A to a mounting plate 270, as by employing appropriate flat headed bolts or rivets 272, and the mounting plate 270 is in turn fixed to piston 16 by appropriate bolt 274. Indicator 273 fixed to seat 14A and cooperating with stationary datum 275 (fixedly carried by or mounted on the tractor in any suitable manner and positioned as above described) replaces indicator 82, though obviously these elements will be mounted for ready observation by the seat rider.

The load cylinder 12A of this embodiment of the invention is essentially the same as that previously described, and includes the rolling diaphragm 32, cylinder 110, and modified upper closure member 112A, though in this embodiment of the invention, the closure member 112A has secured thereto an appropriate arm 277 on which is journaled roller 94 for rolling engagement with the channel-shaped guide member 96 that is fixedly carried by the mounting plate or member 270, this being done to prevent rotation of the seat 14A with respect to the suspension. Also, closure member 112A defines piston guiding opening 271 and a plurality of gas or air vents 272.

At the lower end of the load chamber 12A, the closure member 114 of the embodiment of FIGURE 4 is replaced by an annular plate structure 280 that is formed to define the port 90 as well as bore or passage 282 to which the conduit 40 is connected in any suitable manner in this form of the invention. Thus, conduit 22 is eliminated from this form of the invention.

The spring chamber 18A of this form of the invention includes the aforedescribed rolling diaphragm 34 mounted within an appropriate cylinder member 290. Cylinder member 290 is formed with an internal shoulder 292 to receive the shoulder 164 of diaphragm 34 as well as the rim 294 of annular member 296 that in this form of the invention, carries the damping valves 36 and 38.

The piston 20 of the spring chamber 18A is the same as that in chamber 18 of FIGURES 1–4. The lower end of chamber 18A is closed by a closure member 298 provided with a plurality of vent openings 300 to avoid air entrapment below diaphragm 34.

The closure member 298 and the cylinder member 290 as well as the components it supports are applied to suitable support elements 302 fixed in any suitable manner to the tractor frame, and bolts 304 may be employed to secure the various members together.

The closure member 298 has fixed thereto a leaf spring 92 the function of which is to serve the same purpose as coil spring 210. Spring 92 should be designed to be of the rising spring rate type.

The suspension 10A is charged with hydraulic liquid in the same manner as described in connection with suspension 10, and it is operated in the same manner as suspension 10.

In the variation 10B of FIGURE 6, the damping valves 36 and 38 are eliminated, and damping is provided by the friction devices 100. As already described, the friction devices 100 comprise shoes 102 cooperating with friction surfaces 104, and in the specific arrangement illustrated, the friction surfaces 104 are defined by webs 310 of channel members 312, and the shoes are pressed against the channel members 312 by suitable compression springs 314 mounted in housings 316 that are secured in any suitable manner to the cylinder 110 of chamber 12B.

Otherwise, this form of the invention is the same as described in connection with FIGURE 5.

The modifications illustrated in FIGURE 7 may be applied to the forms of FIGURES 5 and 6 if so desired.

*Distinguishing characteristics of the invention*

It will therefore be seen that I have provided a hydromechanical suspension arrangement that is especially adapted for vehicle seats, and in particular seat structures that are employed on vehicles of the type in which the seat will be subjected to low frequency vibration rates.

A most important advantage of my suspension is that it contains no pneumatic pockets that are relied upon to provide the spring action desired. This eliminates the problems of gas leakage with the consequent strict sealage requirements, and it also overcomes the design problems presented by the fact that compression of air raises its temperature and changes the spring rate of the overall cushion.

Furthermore, the arrangement of my suspension is such that the overall spring rate may be accurately provided for any given suspension condition, and furthermore, the individual occupier of the seat may adjust the seat to give that individual the ride best suited to his weight.

It should be appreciated from the nature of this invention that the invention is susceptible of a wide variety of embodiments.

For instance, it has already been mentioned that many forms of mechanical spring devices may be substituted for the leaf and coil springs illustrated.

Also, the damping arrangement for the seat may be at any convenient point in the suspension system, and under some circumstances may be eliminated entirely, in which case the loaded spring chambers could in effect be made one chamber (in the showing of FIGURE 5 this would involve eliminating the plate 296). And, the piston 20 and its rolling diaphragm 34 may be eliminated in favor of a simple disk type diaphragm suitably mounted in place under the compression of a spring 24.

It will also be appreciated that the various arrangements of the invention may be formed from few and simple parts, most of which are off-the-shelf items, and consequently the device is inexpensive of manufacture, and convenient to apply as well as to use.

My suspension device is not limited to use in connection with seats; it can be employed wherever it is desired to isolate an object, such as a piece of machinery or an instrument, from low frequency jars, or isolating vibrating machinery from its neighbors.

It is pointed out that the basic suspension arrangement of this invention contemplates a number of alternative arrangements depending on whether the load or spring chambers, or both, are to be contoured to provide the specific suspension results contemplated by this invention.

In the forms illustrated, the load chamber is contoured, as by appropriately forming piston 16 (though surface 135 of cylinder 110 could also be so formed, or both said surface 135 and piston 16, if so desired). This type of arrangement provides the results already described.

However, the contouring described in connection with load chamber 12 could be applied instead to the spring chamber 20, that is, to either the piston 20 or cylinder wall surface 217 (or both), but in such instance both the hydraulic liquid control arrangement 39 of FIGURE 4 and the spring adjusting arrangement of FIGURE 7 should be employed, as the hydraulic control arrangement merely raises or lowers the operator without affecting the suspension spring rate due to the resulting rectilinear contour of the load chamber piston and cylinder and the mere adding or subjecting of hydraulic weight to the suspension would not place the contoured spring chamber piston in proper adjustment.

In such case, a stationary datum and pointer arrangement should be provided which includes a pointer stationary with respect to piston 20, which piston 20 is adjustable under the action of handle 101 (of FIGURE 7) with respect to a datum fixed with respect to the tractor frames (and this datum could be datum 84). In this arrangement, the hydraulic arrangement 39 would be employed to adjust the seat elevation to suit the operator (as by providing the desired leg room) without affecting the suspension spring rate. A variation of this form calls for application of the contouring to both the spring and load chambers, with the overall suspension being designed to give the results indicated immediately above.

Where the contouring is applied to the spring chamber, a constant spring rate mechanical spring may be employed, and the contouring of, for instance, piston 20, may be arranged to provide the overall results achieved by using a rising spring rate spring 24.

Still a further alternative is to have the contouring in both the load and spring chambers, and in this instance, both the seat pointer 82 and the aforementioned pointer for spring chamber piston 20 would be required, both of these being disposed for indexing relation with respect to datum 84. In such case, hydraulic system 39 would not be useable as a seat height adjustment device (acting independently of the suspension spring rate) since it would then be involved in setting the suspension to get the desired ride. This alternative would have the advantage of reducing contouring extremes and thereby reducing the material strength requirements of the rolling diaphragms due to a reduced amount of flexion being occasioned.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A load supporting device especially adapted for low vibration frequency applications, said device comprising:
   an upright cylinder,
   a piston member mounted in said cylinder for movement longitudinally thereof,
   means for supporting the load on said piston member,
   a rolling diaphragm member in liquid sealing relation with the lower portion of said cylinder and defining a flexible container,
   with the lower end of said piston member resting on said diaphragm member,
   said diaphragm member being in rolling engagement with said piston member lower end,
   said device further comprising a spring chamber,
   said spring chamber comprising
   a cylinder having piston means mounted thereon in liquid sealing relation therewith for movement longitudinally thereof,
   mechanical spring means for biasing said spring chamber piston means for movement toward one end of said spring chamber,
   said piston means and said one end of said spring chamber defining a variable volume container,
   and conduit means for connecting said containers of said chambers for conducting fluid flow therebetween,
   said containers and said conduit means being fully charged with hydraulic liquid,
   said device further including means cooperating with one of said chambers for providing a substantially constant spring rate over the range of travel of said piston member with respect to said load chamber cylinder,
   stationary datum means for indicating when said piston member is disposed at a predetermined position along its said range of travel,
   means for selectively positioning said piston member at said predetermined position when a load is supported on said piston member,
   and means for damping the cushioning action of said device.

2. The device set forth in claim 1 wherein:
   said means for selectively positioning said piston member comprises means for selectively varying the volume of hydraulic liquid in said containers and said conduit means to vary the volume of said containers as required to move said piston member to said predetermined position.

3. The device set forth in claim 1 wherein:
   said means for selectively positioning said piston member comprises means for selectively varying the biasing action of said mechanical spring means as required to move said piston member to said predetermined position.

4. The device set forth in claim 1 wherein:
   said means for providing said substantially constant spring rate comprises means cooperating with said load chamber rolling diaphragm on vertical movement of said piston member for controlling the flexing action of said flexible container to provide said spring rate when vertical shocks on the load when supported by said device are occasioned.

5. A vehicle seat device especially adapted for low vibration frequency applications, said device comprising:
   a load chamber,
   said load chamber comprising:
   an upright cylinder,
   a piston member mounted in said cylinder for movement longitudinally thereof,
   a vehicle seat supported on said piston member,
   a rolling diaphragm member in liquid sealing relation with the lower portion of said cylinder and defining a flexible container,
   with the lower end of said piston member resting on said diaphragm member,
   said diaphragm member being in rolling engagement with said piston member lower end,
   said device further comprising a spring chamber,
   said spring chamber comprising:
   a cylinder having piston means mounted therein in liquid sealing relation therewith for movement longitudinally thereof,
   mechanical spring means for biasing said spring chamber piston means for movement toward one end of said spring chamber,
   said piston means and said one end of said spring chamber defining a variable volume container,
   and conduit means for connecting said containers of said chambers for conducting fluid flow therebetween,
   said containers and said conduit means being fully charged with hydraulic liquid,
   said load chamber further comprising:
   means cooperating with said rolling diaphragm on vertical movement of said piston member for providing a substantially constant spring rate over the range of travel of said piston member with respect to said load chamber cylinder,
   said device further including:
   stationary datum means for indicating when said piston member is displaced at a predetermined position along its said range of travel,
   means for selectively positioning said piston member at said predetermined position when a load is supported on said piston member,
and means for damping the cushioning action of said device,
said means for selectively positioning said piston member comprising:
means for selectively varying the volume of hydraulic liquid in said containers and said conduit means to vary the volume of said containers as required to move said piston member to said predetermined position.

References Cited in the file of this patent
UNITED STATES PATENTS

| | | |
|---|---|---|
| 602,389 | Whitlow | Apr. 12, 1898 |
| 2,688,150 | Roussel | Sept. 7, 1954 |
| 2,778,627 | Sands | Jan. 22, 1957 |
| 2,961,033 | Galbraith | Nov. 22, 1960 |
| 2,977,146 | Edwards | Mar. 28, 1961 |
| 3,033,558 | Slemmons | May 8, 1962 |
| 3,053,528 | Stengelin | Sept. 11, 1962 |